US009268853B2

(12) United States Patent
Carr et al.

(10) Patent No.: US 9,268,853 B2
(45) Date of Patent: *Feb. 23, 2016

(54) BUSINESS APPLICATION FINGERPRINTING AND TAGGING

(71) Applicant: FMR LLC, Boston, MA (US)

(72) Inventors: Stephen A Carr, Manchester, MA (US); Robert Benedetti, Riverside, RI (US); Dana George Schalk, Nashua, NH (US); John Edward O'Neil, Albany, NY (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,879

(22) Filed: Nov. 28, 2012

(65) Prior Publication Data

US 2014/0149456 A1    May 29, 2014

Related U.S. Application Data

(63) Continuation of application No. 13/687,588, filed on Nov. 28, 2012.

(51) Int. Cl.
G06F 17/30 (2006.01)
G06F 11/30 (2006.01)
G06F 21/55 (2013.01)

(52) U.S. Cl.
CPC ...... G06F 17/30864 (2013.01); G06F 11/3051 (2013.01); G06F 11/3072 (2013.01); G06F 21/552 (2013.01); G06F 2201/83 (2013.01); G06F 2201/865 (2013.01)

(58) Field of Classification Search
None
See application file for complete search history.

(56) References Cited

U.S. PATENT DOCUMENTS

| | | | |
|---|---|---|---|
| 5,495,607 A * | 2/1996 | Pisello et al. | 707/797 |
| 5,499,340 A | 3/1996 | Barritz | |
| 7,305,658 B1 * | 12/2007 | Hamilton et al. | 717/120 |
| 7,797,376 B1 * | 9/2010 | Desai | 709/203 |
| 7,877,482 B1 * | 1/2011 | Ashcraft et al. | 709/226 |
| 7,925,635 B1 | 4/2011 | Ravulur et al. | |
| 2002/0026631 A1 | 2/2002 | Barritz | |
| 2003/0177394 A1 * | 9/2003 | Dozortsev | G06F 21/52 713/187 |

(Continued)

FOREIGN PATENT DOCUMENTS

WO    2007071465 A1    6/2007
WO    2008074527 A1    6/2008

OTHER PUBLICATIONS

"HP Universal CMDB and HP UCMDB Configuration Manager", Data Sheet, Created Oct. 2007, Updated Jun. 2012, Hewlett-Packard Co.

(Continued)

*Primary Examiner* — Aleksandr Kerzhner
*Assistant Examiner* — Matthew Ellis
(74) *Attorney, Agent, or Firm* — Proskauer Rose LLP

(57) ABSTRACT

Various embodiments relate to a system and related method for retrieving configuration information of a computer network. Unique identifiers in the form of fingerprints, tags, or metadata can be associated with a target application. A manager can scan process tables and file system directories of servers within the system to find processes and files that include the unique identifier. The manager can save the server and application information in a configuration database that can subsequently be searched. Such information can include which of the one or more servers has the target application as an active process.

15 Claims, 4 Drawing Sheets

(56) References Cited

U.S. PATENT DOCUMENTS

| | | | |
|---|---|---|---|
| 2005/0198247 A1* | 9/2005 | Perry et al. .................... 709/223 |
| 2007/0214388 A1* | 9/2007 | Auvenshine et al. ........... 714/27 |
| 2009/0106261 A1* | 4/2009 | Nagasaka ......... G06F 17/30017 |
| 2010/0010968 A1* | 1/2010 | Redlich et al. .................... 707/3 |
| 2010/0125595 A1* | 5/2010 | Iizuka .................... G06F 9/445 |
| | | 707/758 |
| 2010/0153926 A1* | 6/2010 | Ben-Yehuda et al. ........ 717/127 |
| 2011/0010705 A1* | 1/2011 | Adams et al. ................. 717/178 |
| 2011/0153697 A1* | 6/2011 | Nickolov et al. ............. 707/827 |
| 2011/0202989 A1* | 8/2011 | Otranen et al. .................... 726/8 |
| 2011/0286395 A1 | 11/2011 | Liebsch et al. |
| 2011/0314345 A1* | 12/2011 | Stern et al. ................... 714/47.1 |
| 2012/0072575 A1* | 3/2012 | King et al. .................... 709/224 |
| 2012/0084135 A1* | 4/2012 | Nissan et al. ............... 705/14.38 |
| 2012/0130936 A1* | 5/2012 | Brown et al. ................... 706/52 |

OTHER PUBLICATIONS

"Handle configuration changes effectively," Technical White Paper, Created Jul. 2012, Hewlett-Packard Co.

International Search Report and Written Opinion from corresponding PCT patent application No. PCT/US2013/071638, dated Oct. 8, 2014, 11 pages.

* cited by examiner

BUSINESS APPLICATION FINGERPRINTING AND TAGGING

REFERENCE TO RELATED APPLICATIONS

This application is a continuation of U.S. patent application Ser. No. 13/687,588, filed on Nov. 11, 2012, the entirety of which is incorporated herein by reference.

TECHNICAL FIELD

Various exemplary embodiments disclosed herein relate generally to methods executed on a computer and a computer-based apparatus, including a computer program product, for fingerprinting and tagging business applications in a computer network.

BACKGROUND

IT managers regularly use various network and system management products to maintain enterprise-wide administration of computer systems. The system management products can include various programs and hardware that enable IT managers to engage in various tasks, such as the monitoring of servers, security management, and software inventory. In large systems, however, it is difficult to determine which applications are installed and regularly used on specific servers within the system. Ineffective monitoring of such applications can slow down the system, as redundant applications may be installed on the same server, while sparse installation of applications throughout the remaining servers within the network can lead to other performances issues, such as long delays and processor overload.

Previous solutions to track application implementation include the mapping of the entire IT infrastructure. However, such solutions required IT managers to manually input and update all the applicable data. Such solutions are therefore hard to scale for large infrastructure or maintain after a high number of changes.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a computerized method for retrieving configuration information of a computer network. The method can comprise a manager receiving a query to identify an application running or stored on a plurality of servers in the computer network. The method can also comprise the manager connecting to a configuration management database (CMDB) and retrieving application and server information from the CMDB. The application and server information can include identification of the application, identification of each server within the plurality of servers on which the application was found running or stored, and identification of each matching unique identifier for the application.

Various embodiments may also relate to a computer program product, tangibly embodied in a non-transitory computer-readable storage medium, for retrieving configuration information of a computer network. The computer program product can comprise instructions operable to cause a data processing apparatus to receive a query to identify an application running or stored on a plurality of servers in the computer network, connect to a configuration management database (CMDB), and retrieve application and server information from the CMDB. Such application and server information can include identification of the application, identification of each server within the plurality of servers on which the application was found running or stored, and identification of each matching unique identifier for the application.

Various embodiments may also relate to an apparatus for retrieving configuration information of a computer network. The apparatus comprising a processor and memory can be configured to receive a query to identify an application running or stored on a plurality of servers in the computer network, connect to a configuration management database (CMDB), and retrieve application and server information from the CMDB. Such application and server information can include identification of the application, identification of each server within the plurality of servers on which the application was found running or stored, and identification of each matching unique identifier for the application.

In other examples, any of the aspects above can include one or more of the following features. In some examples, the manager compiles the application and server information by searching the computer network. Such a search can comprise a manager searching a run-time environment (RTE) of a server in the computer network to identify the application on the server while the server is running. The search can comprise connecting to the server, accessing a process table of the server, comparing a unique identifier associated with the application to active processes listed in the process table, and identifying the application when one of the listed active processes includes a segment that matches the unique identifier. In some examples, the search can further comprise accessing a file system of the server, comparing the unique identifier to files listed in the file system, and identifying the application when one of the listed files includes a segment that matches the unique identifier. In other examples, the manager can search the file system when the manager does not identify the application from active processes in the process table.

In other examples, the search can further comprise accessing a database connected to the server, comparing the unique identifier to contents stored in the database, and identifying the application when contents of the database includes a segment that matches the unique identifier.

In some examples, the comparing step can further comprise conducting a text-based pattern match in the command line structure between the unique identifier and segments of the active processes. In some examples, the method can further comprise the manager updating the application and server information based on a second search of the computer network. In such examples, the manager can periodically update the application and server information based on subsequent searches.

In other examples, the information from the server can include the quantity of files included in the server. In other examples, the information from the server can include metadata related to running the application. In other examples, the information from the server can include a file system path of at least one file associated with the application.

In other examples, the search can further comprise accessing a log file listed in the file system, comparing the unique identifier to the contents of the log file, and identifying the application when the log file includes a segment that matches the unique identifier.

In some examples, the manager can send the application and server information to a user through a terminal computer. In other examples, the manager can update the application and server information, based on the manual update from the user. In such examples, the update can further comprise adding a unique ID to the application and server information. In other such examples, the update can further comprise removing a unique ID from the application and server information. In other examples, the manager can receive an update on the unique identifier. In such examples, the update can comprise a change in search criteria for the unique identifier.

It should be apparent that, in this manner, various exemplary embodiments enable the scalable tracking of applications within an IT infrastructure. Particularly, by enabling a CMDB manager 130 to scan and locate active instances of applications while they are running, a user can regularly maintain a map of an application's implementation without shutting down some or all of the network to complete the scan.

BRIEF DESCRIPTION OF THE DRAWINGS

In order to better understand various exemplary embodiments, reference is made to the accompanying drawings wherein.

DETAILED DESCRIPTION

Figure 1:
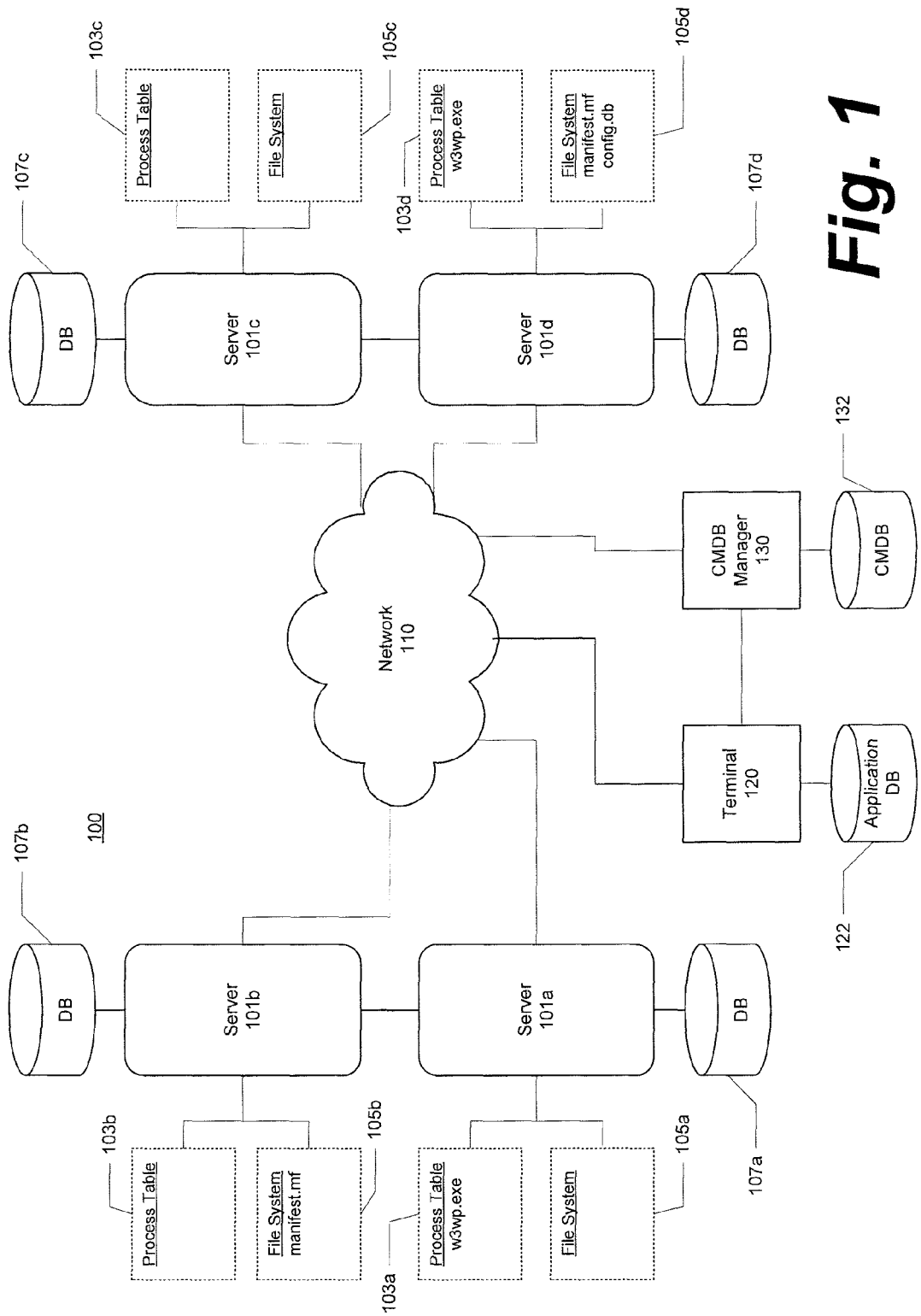
FIG. 1 illustrates an exemplary computer network for finding and identifying unique identifiers for system applications.

Referring now to the drawings, in which like numerals refer to like components or steps, there are disclosed broad aspects of various exemplary embodiments.

FIG. 1 illustrates an exemplary computer network for finding and identifying unique identifiers for system applications. System 100 includes a plurality of servers 101a-101d, with each server 101a-101d being connected to a database (DB) 107a-107d, and each server 101a-101d including a process table 103a-103d and a file system 105a-105d. Each server 101a-101d is connected to the network 110. Terminal 120 and Configuration Management Database (CMDB) Manager 130 are connected to the network and to each other. Application DB 122 is connected to the terminal 120, while CMDB 132 is connected to the CMDB Manager 130.

Servers 101a-101d can be hardware including a processor and memory that can store and run applications for users that connect to at least one of the servers 101a-101d. In some embodiments, the servers 101a-101d can be located within a common network, such as an enterprise intra-network. In some embodiments, one or more of the servers 101a-101d can be located outside of an enterprise network, such as when the enterprise connects to third-party cloud-service servers allocated to the enterprise. Each server 101a-101d is connected to a database 107a-107d. In some embodiments, each server 101a-101d can be connected to one or more databases 107 that is dedicated to storing information for that particular server 101. In some embodiments, one or more servers 101a-101d can be disconnected from a database 107. In some embodiments, multiple servers 101a-101d can share a common database (not shown).

Each of the servers 101a-101d includes a process table 103a-103d that lists active processes running on the server 101a-101d. Each server 101a-101d also includes a file system 105a-105d that includes an index of all files saved on the hard drive or network-attached storage system of the server 101a-101d and all the files loaded into the memory of the server 101a-101d. In some embodiments, the file system 105a-105d includes an index of all the files saved in the connected database 107a-107d. In some embodiments, two or more of the servers 101a-101d can be connected directly to each other. In some embodiments, two or more of the servers 101a-101d can be connected to each other through the network 110. For example, in the illustrative embodiment, all of the servers 101a-101d are connected to each other through the network 110, while servers 101c and 101d, for example, are directly connected to each other.

Process tables 103a-103d list all active processes running on a server 101a-101d. In some embodiments, the process table 103a-103d can be an empty list, such as when no processes are active. In some embodiments, processes that populate the process table 103a-103d can be searchable by a user. For example, a user can send a text query directed to searching the process table. The server 101a-101d can then, for example, compare the text query with the name of active processes listed in the process table 103a-103d. In some embodiments, the CMDB manager 130 can direct the servers 101a-101d to search the respective process tables 103a-103d for the text query. In the illustrative embodiment for example, the server 101a can compare a text search for "w3wp" with the name of the active process "w3wp.exe" listed in the process table 103a. In some embodiments, the query the server 101a-101d receives can be identified as a unique fingerprint, tag, or metadata exclusively associated with a single application. When a unique application name or a unique command line within a running application is identified (i.e., fingerprinted), a user can search in the process table 103a-103d, file system 105a-105d, and/or the connected database 107a-107d for active programs, files, and logs that include the identified unique fingerprint, tag, or metadata. For example, the "w3wp.exe" process can include a command line portion "w3wprunsafe". When the portion "w3wprunsafe" is determined to be unique, a search for "w3wprunsafe" on the server 101a causes the server 101 to search within the compiled program "w2wp.exe" for the portion "w3wprunsafe" while the program is running on the server 101. In some embodiments, the unique portion can be a tag or metadata that is appended to the application so that it is included while the program is running. In such embodiments, a search for the unique tag or unique metadata by the server 101a would similarly have the server 101a search within the compiled program listed in the process table 103a while the program is running.

File system directories 105a-105d can index and list all files saved on hard drives, loaded into memory on the servers 101a-101d, and/or saved in the connected databases 107a-107d. In some embodiments, the file system directories 105a-105d can also include a system map that tracks the relationships between files and folders in a tree structure. In some embodiments, the server 101a-101d can search for a unique fingerprint, tag, or metadata associated with a specific application in both the text of the file listed in the file system 105a-105d, as well as through a search of the contents of a particular file. When a unique portion of a file can be associated exclusively with a specific application, either as a fingerprint, tag, or metadata, a user can subsequently search the entire file system directory 105a-105d of a particular server 101a-101d for all instances of the identified unique portion.

In the illustrative embodiment for example, a user can search for the unique portion "Application-ID: ShipList" that is exclusively associated with a specific application. When servers 101b and 101d search their file systems 105b, 105d, each server 1011b, 101d can look into the contents of all the listed files to determine whether the unique portion is included in any of the listed files. If a server 101b, 101d finds an file that includes the unique portion, the server 101b, 101d can then indicate that the specific application is included in the server 101b, 101d. In some embodiments, a unique portion can be included in a newly-created, specific tag file that is associated with the specific application.

Databases (DB) 107a-107d can be one or more databases associated with servers 101a-101d. In some embodiments, multiple databases 107a-107d can be associated with the same server 101a-101d. In some embodiments, multiple servers 101a-101d can be associated with the same database. Databases 107a-107b can store files, relational databases, configuration databases and other information that can be searched and accessed by a connected server 101a-101d. In some embodiments, the databases 107a-107d stores the relationship between applications and stored files. In some embodiments, the servers 101a-101d can search the file system 105a-105d to search the contents of the connected database 107a-107d. In some embodiments, the server 101a-101d can search the database 107a-107d directly for the unique fingerprint, tag, or metadata.

Network 110 can be a network that connects two or more devices to each other for communications. In some embodiments, the network 110 can be an intranet network, such as a site-specific or enterprise network. In some instances, the network can be a packet-switching network, such as an IP network that enables communication using standard signaling protocols. In some embodiments, the network 110 enables the servers 101a-101d to be connected with one or more terminals, such terminal 120 in the illustrative embodiment, and other devices such as CMDB manager 130, application DB 122, and CMDB 132.

Terminal 120 can be a termination device that includes a processor and memory, such as a desktop, laptop, tablet computer, or smartphone that can connect to the one or more servers 101a-101d through the network 110. In some embodiments, a user terminal 120 can be used to enable one or more users to identify unique identifiers, such as fingerprints, tags, or metadata (i.e., unique ID), which can be exclusively associated with a specific target application. In some embodiments, the terminal 120 can be used by one or more users to query the one or more servers 101a-101d to find instances of the target applications. In such instances, the user can request the servers 101a-101d to search for the target application; alternatively, the user can initiate a search for instances of the unique ID or multiple unique IDs associated with the target application to determine whether the target application is on one or more servers 101a-101d within the system 100.

In some embodiments, the terminal 120 can have the CMDB manager 130 search its connected CMDB 132 for known instances of the application. For example, the CMDB manager 130 can conduct a search through the servers 101a-101d for a specific application (either through periodic searches or through requests made by a user) and store the search results in CMDB 132. When a user subsequently searches for the same application, the CMDB manager 130 can simply search and retrieve the results of the CMDB 132 in lieu of conducting the search through all of the servers 101a-101d. In some embodiments, the user can also confirm or change relationship between the one or more unique IDs and the target application based on the results that the terminal 120 reports to the user. In some embodiments, the terminal can send the user's queries and updates to the CMDB manager 130, which can handle the queries sent to the servers 101a-101d and the CMDB 132.

Application database (DB) 122 can be one or more databases connected to the terminal. Application DB 122 can be a relational database that stores the relationship between applications and their respective unique identifiers (e.g., fingerprints, tags, metadata, etc.) and unique facts. In some embodiments, the terminal 120 and/or CMDB manager 130 can automatically search for unique fingerprints and add tag portions in processes and files and/or specialized tag files to associate with a specific program. In some instances, the application DB 122 can add and/or update application relationships to unique IDs and unique application facts based on user inputs through the terminal 120. In some instances, the CMDB manager 130 can access the application DB 122 before conducting its searches for instances of specific applications within the connected servers 101a-101d.

Configuration Management Database (CMDB) manager 130 can be a device that includes a processor and a memory, such as a desktop, laptop, tablet computer, or smartphone that can connect to the one or more servers 101a-101d through the network 110. In some embodiments, the device can comprise both the terminal 120 and the CMDB manager 130. CMDB manager 130 can receive instructions to locate a specific program within the network 110 and can run searches on the servers 101a-101d to identify instances of the specific program or application running or stored on the servers 101a-101. CMDB manager 130 can subsequently retrieve such identifications and can report and store the results of its findings.

For example, the CMDB manager 130 can conduct a search throughout the network 110 and find unique identifiers on servers 101a, 101b, and 101d. CMDB manager 130 can report found instances of the identified application to the terminal 120 and can also save the search results in CMDB 132. In some instances, the CMDB manager 130 can subsequently retrieve the search results from the CMDB 132 in lieu of conduct another search through the entire network 110. In some embodiments, the CMDB manager 130 can periodically update the search results, while retrieving the search results from the CMDB 132 between updates when a user enters a query.

Configuration Management Database (CMDB) 132 can be one or more databases connected to the CMDB manager 132 that tracks and stores the configuration of various devices connected to the network 110. CMDB 132 can contain details all the configuration items (CIs) in the network infrastructure connected to the network 110, including, for example, the contents of each of the servers 101a-101d and the locations where specific applications are installed. In some embodiments, a user can query the CMDB 132 to find relationships between components and track configurations of the components. In some embodiments, the CMDB 132 can store, add, and update metadata associated with the CIs stored within the database. In some embodiments, the CMDB 132 can update the relationships of CIs based on the search results of the CMDB manager 130. For example, when in the illustrative embodiment the CMDB manager 130 finds unique identifiers associated with a specific program on servers 101a, 101b, and 101d, the CMDB 132 can store the relationships such that instances of the identified application are associated with servers 101a, 101b, and 101d. In some embodiments, the CMDB manager 130 can query the CMDB 132 to find the stored relationship in lieu of conducting a new search on through the network 110. In some embodiments, a user can query to the CMDB 132 to identify and test unique identifiers based on the relationships compiled in the CMDB 132. For example, the CMDB 132 can store the relationship between a specific file and specific servers within the system. A user can then track these relationships to see a 1:1 relationship between instances of the file and instances of a specific application throughout the network. The user can then create a unique identifier for the identified file and test its effectiveness in a subsequent search for the specific application.

Figure 2:
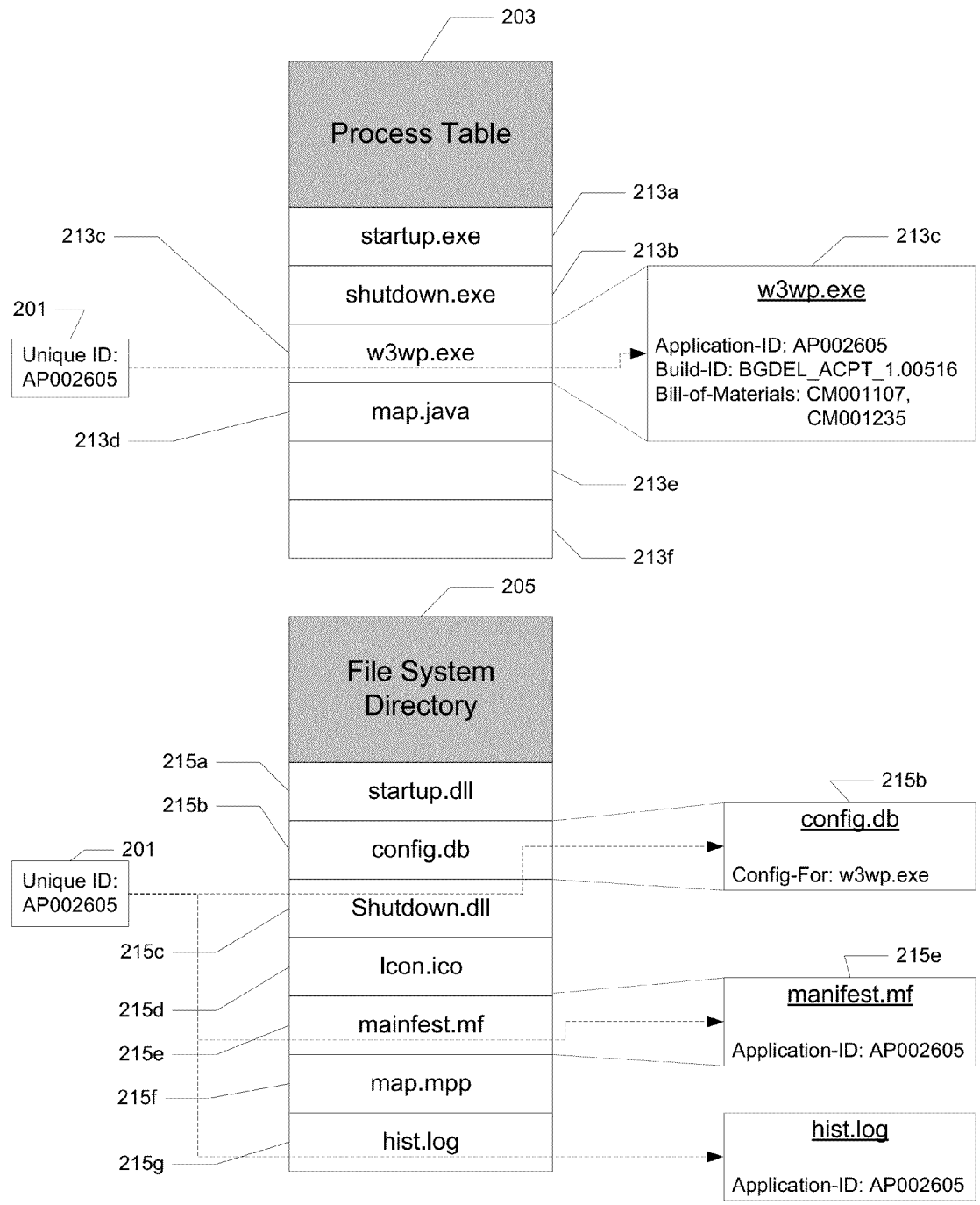
FIG. 2 illustrates an exemplary process table and an exemplary file system directory on a server on which a search is conducted.

FIG. 2 illustrates an exemplary process table and an exemplary file system directory on a server on which a search is conducted. A CMDB manager 130 of system 100 can compare a unique identifier 201 with the contents of the process table 203 and the file system directory 205 on the respective servers 101a-101d. Process table 203 is similar to the process tables 103a-103d illustrated in system 100 and includes a plurality of process table entries 213a-213f. File system directory 205 is similar to the file system directories 105a-105d illustrated in system 100 and includes a plurality of file system entries 215a-215g.

Process table 203 can include a plurality of process table entries 213a-213f. When the process table 203 is populated with process table entries 213a-212f, the CMDB manager 130 can compare a queried unique identifier 201 with the contents of each process table entry 213a-213f. In the illustrative embodiment for example, the CMDB manager 130 can compare the unique ID of "AP002605" with the contents of the compiled "w3wp.exe" program while it is running on the server 101d. The CMDB manager 130 can compare the "AP002605" unique ID 201 with the contents of the process table entry 213c and determine whether there is a match. As a result, once the match is found, the CMDB manager 130 can identify the target application as active on the server 101d. In some embodiments, the CMDB manager 130 can report the absence of the target application when the CMDB manager 130 fails to find a match for the unique ID 201 within the process table entries 213a-213f running on the server 101c.

File system directory 205 can include a plurality of file system entries 215a-215g. In some embodiments, the file system entries 215a-215g can follow a tree structure that mirrors the file system structure of the server 101a-101d. In some embodiments, the file system directly 205 lists files in both the server 101a-101d and the attached databases 107a-107d. When the file system directory 205 is populated with file system entries 215a-215g, the server 101a-101d of the system 100 can compare a queried unique identifier 201 with the contents of the file directory 215a-215g. In the illustrative embodiment for example, the CMDB manager 130 can compare the unique ID 201 of "AP002605" with the contents of the "config.db", "manifest.mf", and "hist.log" files 215b, 215f, 215g for a matching portion. When a match is found, the CMDB manager 130 can report that the target application is stored on the server. In some embodiments, the CMDB manager 130 can avoid searching the file system directory 205 or specific file system entries 215a-215g. For example, the CMDB manager 130 can be configured to stop searching for the target application once it finds a match for an applicable unique identifier 201 in the process table 203. Similarly, in some embodiments, the CMDB manager 130 can be configured to only search the contents of files in the file system directory 205, or search the contents of specific files or file types, such as *.log file 215g, only when the CMDB manager 130 could not find applicable matches in, for example, the process table 203.

In some embodiments, the CMDB manager 130 can report that the target application is stored on the server 101a-101d, even when the CMDB manager 130 does not match a specific unique ID 201 with a unique portion of a file. For example, in such embodiments, a target application can be associated with unique programs. When the CMDB manager 130 searches for the unique ID 201 associated with the target application, the CMDB manager 130 can report the presence of the target application when finding either the unique ID 201 within a file system entry 215a-215g or a file system entry 215a-215g exclusively linked to the target application. In the illustrative embodiment for example, the CMDB manager 130 searches for the presence of the target application by searching for the unique ID 201 within the file system entries 215a-215g. When the CMDB manager 130 finds matching text within the contents of the file system entry 215e ("manifest.mf"), the CMDB manager 130 can report the presence of the target application within the server 101d. Alternatively, when the CMDB manager 130 searches the content of entry 215b, it can determine that the unique ID 201 and the linked program are associated with the same target application. As a result, the CMDB manager 130 can report the presence of the target application even though the CMDB manager 130 did not specifically find the matching text for the unique ID 201 within the file system entry 215b.

Figure 3:
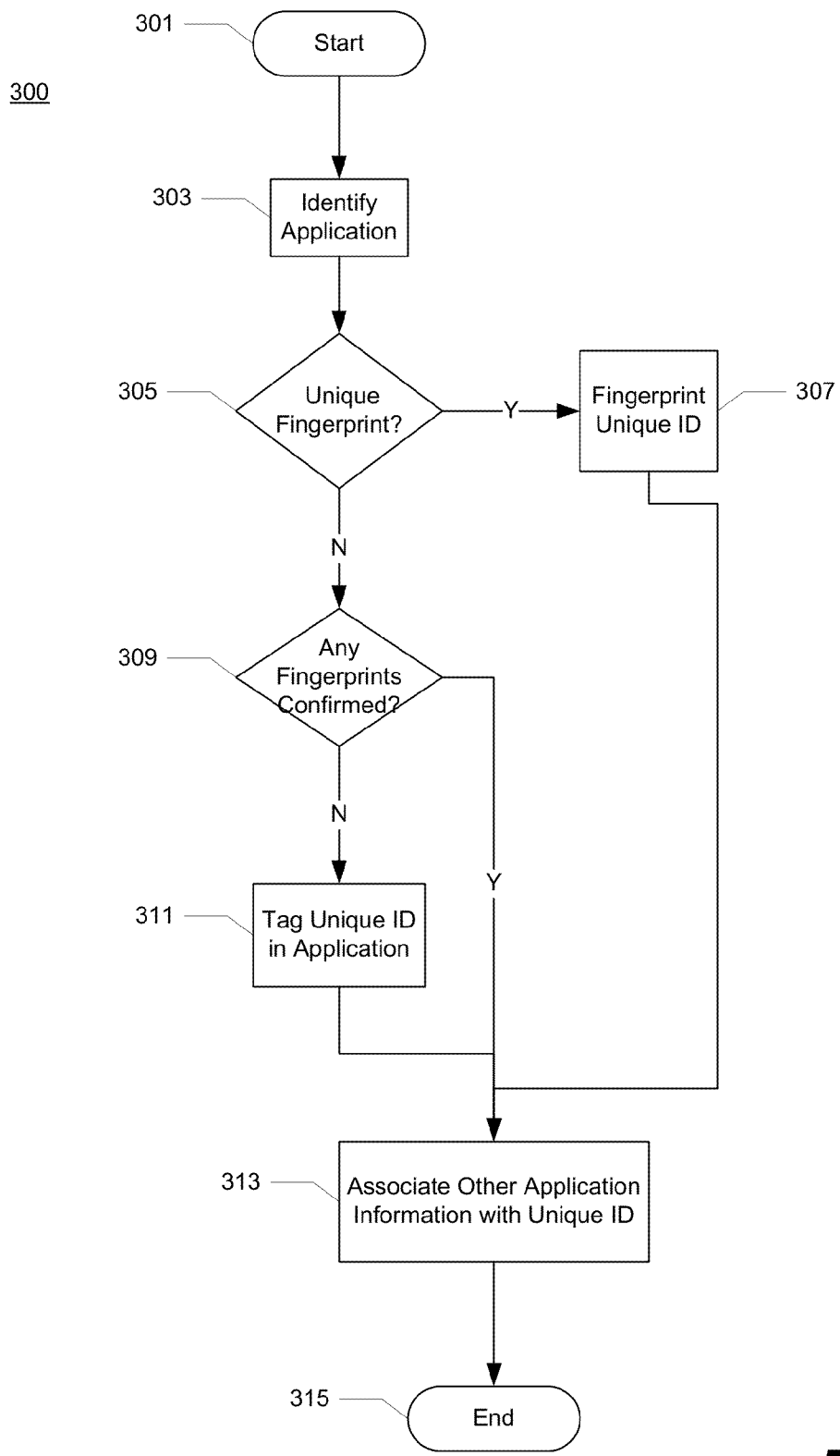
FIG. 3 illustrates an exemplary flowchart for associating a unique identifier with a system application.

FIG. 3 illustrates an exemplary flowchart for associating a unique identifier with a system application. A terminal 120 can implement method 300 to associate one or more unique identifiers with a specific target application, which can be stored in application DB 122 or CMDB 132 and subsequently used by the CMDB manager 130 when conducting searches. Method 300 starts at step 301 and proceeds to step 303 where a specific target application is identified. In some embodiments, a user of the terminal 120 selects or inputs a specific target application.

The terminal 120 can then proceed to step 305, where it is determined whether a unique, new fingerprint exclusive to the target application has been identified. In some embodiments, the user can supply an identification of a potentially-unique fingerprint included within the target application or associated files. In some embodiments, the terminal 120 can suggest potentially-unique fingerprints by comparing the applications and files exclusively associated with the target application to other known processes and files. In such embodiments, the terminal 120 can either formulate such suggestions itself, or it can receive suggestions formed by CMDB manager 130, CMDB 132, or application DB 122. If a potentially-unique fingerprint is identified at step 305, the terminal 120 proceeds to step 307 where the fingerprint is associated with the target application as a unique identifier (ID) 201. After creating the unique ID, the terminal proceeds to step 313.

If the terminal 120 determined in step 305 that a potentially-unique fingerprint was not identified, the terminal 120 proceeds to step 309, where it determines whether any unique fingerprints are already associated with the target application. If so, the terminal 120 proceeds to step 313. Otherwise, the terminal 120 proceeds to step 311 where a unique ID in the form of a tag or metadata is appended to one or more processes and/or files associated with the target application. In some embodiments, the terminal 120 can conduct step 311 even when a unique ID fingerprint, tag, or metadata is already associated with the target application. In some embodiments, the terminal 120 can create a new file specifically to include the unique ID tag and/or metadata. In such instances, the new file is associated exclusively with the target application. In some embodiments, multiple unique ID tags or metadata can be added to a file. This can, for example, allow various tag portions to be discoverable using different search methods (e.g., Websphere, Tomcat, etc.), include various tag types (e.g., environmental tags, application tags), and enable different uses for the tags (e.g., chargeback, identification). Once the new unique ID is formed, the terminal 120 can proceed to step 313.

In step 313, the terminal 120 can associate other application information with each other. For example, the terminal 120 can associate the unique ID 201 with other files and processes already associated with the target application. For example, when a unique ID fingerprint 201 is identified and associated with the target application, other information associated with the application is also associated with the unique ID fingerprint 201. If the target application of the example communicates over the network 110 with a particular database 107a-107d, the terminal 120 in step 313 associates the unique ID 201 with the known relationship between target application and the particular database 107a-107d. Once all of the application information is associated with the unique ID 201, the terminal 201 can end method 300 at step 315.

Figure 4:
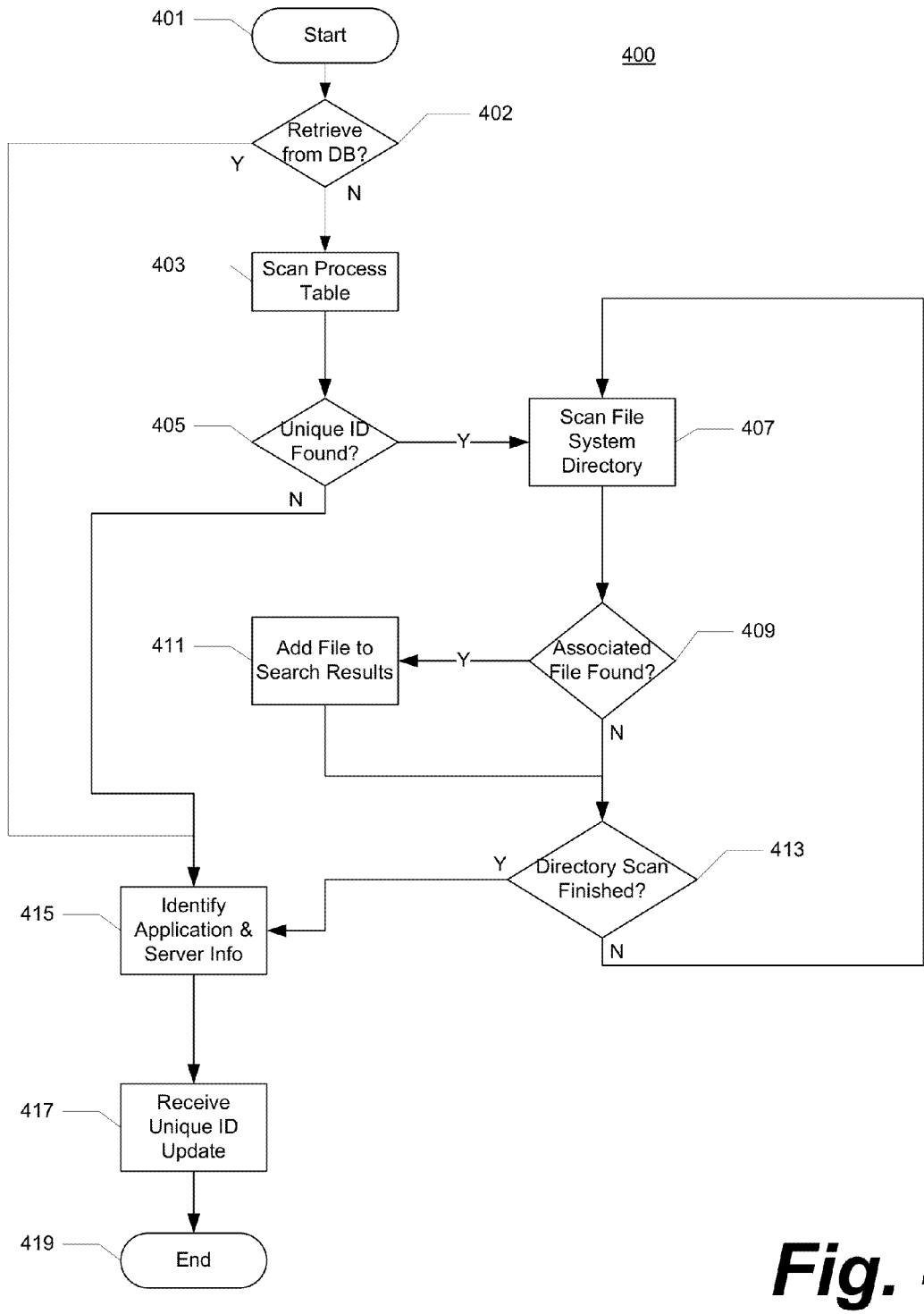
FIG. 4 illustrates an exemplary flowchart for identifying a system application using a unique identifier.

FIG. 4 illustrates an exemplary flowchart for identifying instances of a system application using a unique identifier. In some embodiments, the CMDB manager 130 can implement method 400 to retrieve from the CMDB 132 or search the one or more servers 101a-101d to identify instances of the target application throughout the network 110. In some embodiments, the CMDB manager 130 implements method 400 after receiving a search request from the terminal 120 to search for a specific application or unique ID 201. In some embodiments, the CMDB manager 130 conducts method 400 to perform searches and record the periodic search results.

Method 400 can start at 401 and proceed to step 402, the CMDB manager 130 determines whether the retrieve search results from the CMDB 132. For example, the CMDB 132 can have stored search results from previously-run searches conducted by the CMDB manager 130 throughout the network 110. In such instances, the CMDB manager 130 can then proceed to step 415 and report the application and server information stored in the CMDB 132. If the CMDB manager 130 does not retrieve the information from CMDB 132, it can proceed to step 403, where a CMDB manager 130 scans the process table 203. In some embodiments, the terminal 120 initiates the search the CMDB manager 130, while in other embodiments, the CMDB manager 130 periodically initiates its search. The CMDB manager 130 can scan the active process entries 213a-213f using, for example, a text-based pattern matching technique in the command line structure of the process entries 213a-213f while the processes are still running.

When scanning the process table, the CMDB manager 130 can proceed to step 405, where it determines whether a matching unique ID 201 is located within the particular process entries 213a-213f of the process table 203. When the CMDB manager 130 determines that it found a matching unique ID 201, it may proceed to step 407 to scan the file system directory. In some embodiments, the CMDB manager 130 only confirms the presence of the target application in a server 101a-101d when the CMDB manager 130 finds both an active process 213a-213f in the process table 203 and a file 215a-215g in the file system directory 205 that are associated with the target application. When the CMDB manager 130 in step 405 determines that the process table 203 does not contain any active processes 213a-213f that contain the unique ID 201 and/or are associated with the target application, the CMDB manager 130 can proceed to step 415 to report that the target application was not found on the server 101a-101d. In some embodiments, the CMDB manager 130 can proceed directly from step 405 to step 415 upon a match when, for example, it does not need to confirm a file that also contains a matching unique ID 201.

In step 407, the CMDB manager 130 can scan the file system directory 205 for files that contain the unique ID 201. In some embodiments, the CMDB manager 130 only conducts step 407 when it first determines through a scan of the process table 203 that a process table entry 213a-213f associated with the target application is actively running. In other embodiments, the CMDB manager 130 can proceed to step 407 only when a matching unique ID 201 was not found in step 405. The CMDB manager 130 in step 407 can scan the file system entries 215a-215g of the file system directory 205 to determine whether files associated with the target application are included in the server 101a-101d. The CMDB manager 130 in step 409 can then determine whether the file entry 215a-215g is associated with the target application. If the CMDB manager 130 determines such association, the CMDB manager 130 proceeds to step 411, where the scanned file entry 215a-215g is included in the search results. However, if the CMDB manager 130 determines that no association exists, the CMDB manager 130 proceeds to step 413.

At step 413, the CMDB manager 130 determines whether a full scan of the file system directory 205 is complete. If the CMDB manager 130 determines it has scanned the entire file system directory 205, the CMDB manager 130 proceeds to step 415. Otherwise, the CMDB manager 130 returns to step 407 to continue scanning the file system directory 205.

The CMDB manager 130 in step 415 can identify and/or report application and server information based on its determination through scanning. In some embodiments, the CMDB manager 130 can first determine whether the entire process table 203 and/or file system directory 205 (e.g., step 413) is complete for each of the servers 101a-101d before proceeding to step 415. If the CMDB manager 130 finds the unique ID 201 in the processes and files on the server 101a-101d, or alternatively finds linked processes and files on the server 101a-101d, the CMDB manager 130 can identify and/or report the active presence of the target application on the server 101a-101d. In some embodiments, the CMDB manager 130 can also report the specific processes and files found when scanning the particular server 101a-101d. In some embodiments, the CMDB manager 130 reports the application and server information on a display at the terminal 120. In some embodiments, the CMDB manager 130 reports the application and server information to another program in the terminal 120. In some embodiments, the server and application information that the CMDB manager 130 reports can include other information, such as, for example, application-host relationships, "no match" warnings, pattern errors, non-unique patterns, and non-discoverable patterns. In some embodiments, the CMDB manager 130 stores the application and server information in the CMDB 132 and/or the application DB 122. Once the CMDB manager 130 completes its report at step 415, it can proceed to step 417.

At step 417, the CMDB manager 130 (through the terminal 120) can receive feedback in the form of an update based on its search results. In some embodiments, the CMDB manager 130 can receive updates from the user to refine and/or redefine the relationships between the unique ID and the target application. This can be done, for example, when a supposed unique ID 201 is found to be, for example, a non-unique pattern, or when the supposed unique ID 201 is non-discoverable. The CMDB manager 130 or terminal 120 can receive confirmation of a satisfactory unique ID 201 if the unique ID 201 is sufficient for identifying active instances of the target application in the one or more servers 101a-101d. The CMDB manager 130 can also receive a rejection order from the user if the unique ID 201 is insufficient to identify the target application. In such instances, the CMDB manager 130 and/or terminal 120 can disassociate the unique ID 201 from the application so that the unique ID 201 is not used to scan for active instances of the target application. Once the CMDB manager 130 receives the unique ID update at step 417, it can proceed to step 419 to end method 400.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

We claim:
1. A computerized method for locating configuration information for an application in a computer network, the method comprising:
- connecting, by a manager, to a configuration management database (CMDB);
- compiling, by the manager, application and server information for the computer network by scanning the computer network using a potential identifier for a target application, the scan comprising
  - scanning, by a manager, a run-time environment (RTE) of each of a plurality of servers in the computer network to locate an instance of the target application on the server while the server is running, the scan of each server comprising
    - connecting to the server,
    - accessing a process table of the server, the process table comprising a plurality of process entries, each process entry representing an application running on the server,
    - locating executable code for each listed application in the process table,
    - for each listed application, conducting a text-based pattern match in the command line argument structure between the potential identifier associated with the target application and contents of the listed application, and
    - locating a first instance of the target application running on the server when the contents of one of the listed applications in the process table includes an executable code segment that matches the potential identifier,
    - retrieving files associated with the located first instance of the target application and configuration details of configuration items (CIs) on the server as application and server information for the server;
  - accessing a file system of the server;
  - comparing the potential identifier to contents of a plurality of files listed in the file system, wherein the plurality of files includes a tag file generated by the CMDB;
  - locating a second instance of the target application stored or running on the server when one of the listed files includes a segment that matches the potential identifier,
  - retrieving files associated with the located second instance of the target application and configuration details of configuration items (CIs) on the server as application and server information for the server, and
  - storing the application and server information on the CMDB,
  - wherein the application and server information includes:
    - identification of each instance of the target application located using the potential identifier, the potential identifier comprising a text segment included in: a portion of executable code for the target application, a command line argument structure of the target application, and an application-specific tag file generated by the CMDB,
    - identification of each server within a plurality of servers in the computer network on which each instance of the target application was located using the potential identifier as running or stored, and
    - detailed information on CIs in the computer network; and
  - generating, by the manager, a unique identifier based on the application and server information stored on the CMDB, comprising:
    - scanning the CMDB for a unique, non-changing text segment in the application and server information associated only with the target application, and
    - fingerprinting the unique, non-changing text segment as a unique identifier for the target application, wherein presence of the unique identifier only locates instances of the target application within the application and server information.

2. The method of claim 1, further comprising:
updating, by the manager, the application and server information based on a second scan of the computer network using the potential identifier.

3. The method of claim 2, wherein the manager periodically updates the application and server information based on subsequent scans using the potential identifier.

4. The method of claim 1, wherein the application and server information for each server further includes:
a quantity of files included in the server;
a file system path of at least one file associated with the target application; and
metadata related to CIs running an instance of the target application.

5. The method of claim 1, further comprising:
receiving, by the manager, an update of the potential identifier.

6. The method of claim 5, wherein the update comprises:
substituting the potential identifier with the unique identifier when the potential identifier does not only provide the identified target application instances.

7. The method of claim 1, further comprising:
accessing a log file listed in the file system of the server;
comparing the potential identifier to the contents of the log file; and
locating a third instance of the target application stored or running on the server when the log file includes a segment that matches the potential identifier.

8. The method of claim 1, further comprising:
accessing a database connected to the server;
comparing the potential identifier to contents of files stored in the database; and
locating a fourth instance of the target application stored or running on the server when contents of the database includes a segment that matches the potential identifier.

9. The method of claim 1, wherein the manager scans the file system when the manager does not locate a first instance of the target application running on the server from scanning contents of the listed applications in the process table.

10. The method of claim 1, further comprising:
sending, by the manager, the application and server information to a user through a terminal computer.

11. The method of claim 10, further comprising:
updating, by the manager, the application and server information based on a manual update by the user.

12. The method of claim 11, further comprising:
adding a second unique identifier to the application and server information from the manual update by the user.

13. The method of claim 11, further comprising:
removing the potential identifier from the application and server information from the manual update by the user.

14. A computer program product, tangibly embodied in a non-transitory computer-readable storage medium, for locating configuration information for an application in a computer network, the computer program product comprising instructions operable to cause a data processing apparatus to:
connect to a configuration management database (CMDB),
compile application and server information for the computer network by scanning the computer network using a potential identifier for a target application, the scan comprising
    scanning a run-time environment (RTE) of each of a plurality of servers in the computer network to locate an instance of the target application on the server while the server is running, the scan of each server comprising connecting to the server,
    accessing a process table of the server, the process table comprising a plurality of process entries, each process entry representing an application running on the server,
    locating executable code for each listed application in the process table,
    for each listed application, conducting a text-based pattern match in the command line argument structure between the potential identifier associated with the target application and contents of the listed application,
    locating a first instance of the target application running on the server when the contents of one of the listed applications in the process table includes an executable code segment that matches the potential identifier,
    retrieving files associated with the located first instance of the target application and configuration details of configuration items (CIs) on the server as application and server information for the server,
    accessing a file system of the server,
    comparing the potential identifier to contents of a plurality of files listed in the file system, wherein the plurality of files includes a tag file generated by the CMDB,
    locating a second instance of the target application stored or running on the server when one of the listed files includes a segment that matches the potential identifier,
    retrieving files associated with the located second instance of the target application and configuration details of configuration items (CIs) on the server as application and server information for the server, and
    storing the application and server information on the CMDB,
    wherein the application and server information includes:
        identification of each instance of the target application located using the potential identifier, the potential identifier comprising a text segment included in: a portion of executable code for the target application, a command line argument structure of the target application, and an application-specific tag file generated by the CMDB,
        identification of each server within a plurality of servers in the computer network on which each instance of the target application was located using the potential identifier as running or stored, and
        detailed information on CIs in the computer network; and
generate a unique identifier based on the application and server information stored on the CMDB, comprising:
    scanning the CMDB for a unique, non-changing text segment in the application and server information associated only with the target application, and
    fingerprinting the unique, non-changing text segment as a unique identifier for the target application, wherein presence of the unique identifier only locates instances of the target application within the application and server information.

15. An apparatus for identifying configuration information for an application in a computer network, the apparatus comprising a processor and memory configured to:
connect to a configuration management database (CMDB),
compile application and server information for the computer network by scanning the computer network using a potential identifier for a target application, the scan comprising
    scanning a run-time environment (RTE) of each of a plurality of servers in the computer network to locate an instance of the target application on the server while the server is running, the scan of each server comprising connecting to the server,
    accessing a process table of the server, the process table comprising a plurality of process entries, each process entry representing an application running on the server,
    locating executable code for each listed application in the process table,
    for each listed application, conducting a text-based pattern match in the command line argument structure between the potential identifier associated with the target application and contents of the listed application,
    locating a first instance of the target application running on the server when the contents of one of the listed applications in the process table includes an executable code segment that matches the potential identifier,
    retrieving files associated with the located first instance of the target application and configuration details of configuration items (CIs) on the server as application and server information for the server,
    accessing a file system of the server,
    comparing the potential identifier to contents of a plurality of files listed in the file system, wherein the plurality of files includes a tag file generated by the CMDB,
    locating a second instance of the target application stored or running on the server when one of the listed files includes a segment that matches the potential identifier,
    retrieving files associated with the located second instance of the target application and configuration details of configuration items (CIs) on the server as application and server information for the server, and
    storing the application and server information on the CMDB,
    wherein the application and server information includes:
        identification of each instance of a target application located using the potential identifier, the potential identifier comprising a text segment included in: a portion of executable code for the target application, a command line argument structure of the target application, and an application-specific tag file generated by the CMDB,
        identification of each server within a plurality of servers in the computer network on which each instance of the target application was located using the potential identifier as running or stored, and
        detailed information on CIs in the computer network; and generate a unique identifier based on the application and server information stored on the CMDB, comprising:
  scanning the CMDB for a unique, non-changing text segment in the application and server information associated only with the target application, and
  fingerprinting the unique, non-changing text segment as a unique identifier for the target application, wherein presence of the unique identifier only locates instances of the target application within the application and server information.

* * * * *